United States Patent [19]

Hürter et al.

[11] Patent Number: 4,948,663
[45] Date of Patent: Aug. 14, 1990

[54] ADHESIVE LABEL

[75] Inventors: Hans-Ulrich Hürter; Dieter Frenkler, both of Schwelm, Fed. Rep. of Germany

[73] Assignee: Jackstadt GmbH, Wuppertal, Fed. Rep. of Germany

[21] Appl. No.: 84,592

[22] Filed: Aug. 6, 1987

[30] Foreign Application Priority Data

Sep. 2, 1986 [DE] Fed. Rep. of Germany ....... 3629770
Sep. 16, 1986 [DE] Fed. Rep. of Germany ....... 3631397

[51] Int. Cl.⁵ .......................... B32B 5/16; B32B 7/10; B32B 27/08; B32B 27/40
[52] U.S. Cl. ................................... 428/331; 428/353; 428/354; 428/424.8; 428/425.1
[58] Field of Search .................. 428/353, 424.8, 425.1, 428/354, 331

[56] References Cited

U.S. PATENT DOCUMENTS

| | | |
|---|---|---|
| 2,555,745 | 6/1951 | Hopkins et al. ...................... 428/353 |
| 2,964,422 | 12/1960 | Bergstedt et al. .................... 428/353 |
| 3,085,903 | 4/1963 | Bemmels ............................. 428/353 |
| 3,656,998 | 4/1972 | Ottmann et al. ............. 428/425.1 X |
| 3,726,752 | 4/1973 | Provost ........................... 428/353 X |
| 4,175,156 | 11/1979 | Ikins ............................. 428/425.1 X |
| 4,308,310 | 12/1981 | Arnold et al. ........................ 428/353 |
| 4,587,167 | 5/1986 | Maietti et al. .................. 428/346 X |
| 4,668,576 | 5/1987 | Yotsuya et al. ...................... 428/353 |
| 4,766,177 | 8/1988 | Miller et al. ................ 428/424.8 X |

FOREIGN PATENT DOCUMENTS

| | | |
|---|---|---|
| 156475 | 7/1952 | Australia ........................... 428/425.1 |
| 1594060 | 7/1970 | Fed. Rep. of Germany . |
| 2546108 | 4/1976 | Fed. Rep. of Germany . |
| 3416378 | 11/1984 | Fed. Rep. of Germany . |
| 3417746 | 11/1985 | Fed. Rep. of Germany . |
| 58-129078 | 8/1983 | Japan ................................. 428/425.1 |
| 61-21175 | 1/1986 | Japan ................................... 428/353 |
| 1511060 | 5/1978 | United Kingdom . |

*Primary Examiner*—George F. Lesmes
*Assistant Examiner*—J. Davis
*Attorney, Agent, or Firm*—Browdy and Neimark

[57] ABSTRACT

An adhesive label comprising, in order, a printing carrier, a primer on the back of the printing carrier, an adhesion layer, a covering layer, and an optional adhesive-repellent layer between the adhesion layer and the cover layer. The primer comprises isocyanate-terminated compounds, particularly isocyanate-terminated polyurethanes. The adhesive label is made by applying the adhesion layer to the covering layer or to the optional adhesive-repellent layer on the covering layer, and combining the adhesion layer and a stratum made from the printing carrier and the primer by applying the adhesion layer onto the primer.

7 Claims, 1 Drawing Sheet

ADHESIVE LABEL

FIELD OF THE INVENTION

The invention relates to an adhesive label, consisting of a printing carrier, a primer on the back of the printing carrier, a layer of adhesive on the side of the primer oriented away from the printing carrier, a covering layer on the side of the adhesion layer oriented away from the primer and, if required, of an adhesive-repellent layer between the adhesion layer and the cover layer, the adhesion layer preferably being removable. The invention further relates to an especially effective method for the manufacture of an adhesive label in which the primer is applied to the back of the printing carrier.

BACKGROUND OF THE INVENTION

Adhesive labels of the type under discussion have basically been known for a long time (see German Laid-open Applications DE-OS No. 34 17 746, 25 46 108 and 15 94 060). Adhesive labels which can be removed again, i.e., which can be removed after having been glued on once, make special demands on the chemical composition of the several layers of such an adhesive label, especially on the chemical composition of the adhesion layer. The printing carrier, which can consist of many types of material, though mostly of paper, and which represents the real surface of the adhesive label, in most cases can only be mechanically stressed to a limited degree and therefore requires the adhesion layer to have a low peeling value. At the same time, the adhesion layer must optimally stick on the substrate on which it is glued. The material of the adhesion layer must, on the one hand, be very free-flowing in order to peel off an adhesive label with as little residue as possible, and, on the other hand, the material must also show good internal cohesion. The peeling value also should not be permitted to increase too much in respect to the duration of adhesion, but should optimally be as constant as possible. Finally, the adhesion of the adhesion layer to the printing carrier must be greater than to the substrate on which it is glued, regardless of good adhesion to the substrate on which it is glued.

It is precisely the special demands for a removable adhesive label that have led to a special interest being given to the primer attached to the back of the printing carrier. In the final analysis, the previously noted requirements make considerable demands on this primer. The state of the art works with a primer applied in the liquid phase which, after brief initial drying, is covered with the adhesive of the adhesive layer, also sill in the liquid phase. Primer as well as adhesive are materials dissolved in highly volatile liquid hydrocarbon solvents.

A special problem of the known adhesive labels is their tendency to age because of migration of molecules from the adhesive layer into the printing carrier and because of chemical changes in the adhesive layer. A further considerable problem is the use of environmentally burdensome solvents for the primer and adhesives of the adhesive layer. Finally, the cost effectiveness of the known removable adhesive labels is not yet satisfactory.

SUMMARY OF THE INVENTION

The entire object of the teaching of the invention is the improvement of the known adhesive label described above from the standpoint of the product and its manufacture in regard to subsequent removal, resistance to aging, ease of manufacture, environmental compatibility and cost effectivess.

The adhesive label of the invention in which the above object has been achieved is characterized in that the primer consists of isocyanate-terminated (NCO-terminated) solvents. It is especially advantageous if the primer consists of isocyanate-terminated polyurethane. However, other isocyanate-terminated compounds are also conceivable, for example, isocyanate-terminated natural rubber.

In accordance with the invention, it has been realized that the material of the primer of an adhesive label of the type in question has a decisive importance, especially with a view to its subsequent removal. Especially the chemical reactions between the printing carrier, the primer and the adhesive, taking into consideration the hardening of the primer over time, lead to the desired effective anchoring of the adhesive layer in the printing carrier and to the desired bonding of the adhesive label.

The invention assigns special importance to the manufacture of the primer from isocyanate-terminated compounds, especially from isocyanate-terminated polyurethane. For low-molecular isocyanate polyurethanes the following general reaction formula is valid:

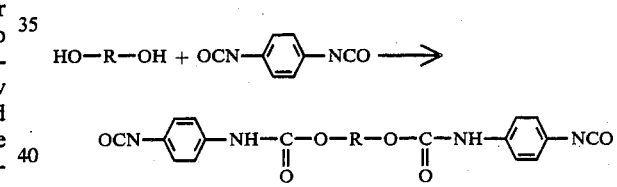

The following formula for a polyether diol as a residual group is obtained:

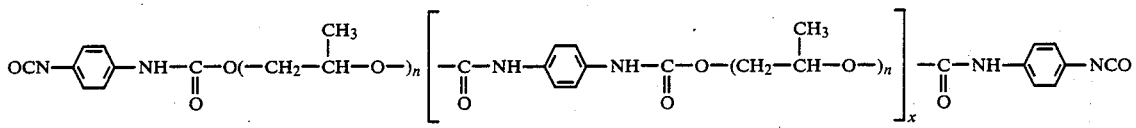

This is only an example for a particular residual group, the values for n and x also being variable within a wide range here. It is of importance that with isocyanate-terminated compounds the addition of water from the air or from the paper used as the printing carrier leads to the formation of polycarbamide derivatives resulting in high-grade linking. In parallel, bonding with functional groups of the printing carrier and the adhesive layer (OH group, COOH group, $NH_2$ group, etc.) takes place, resulting in an active anchoring of the terminating isocyanate groups of the primer.

Additional fillers can be used for the modification of the properties of the primer. It is especially recommended to add a highly dispersed, pyrogenic, especially water-repellent silicic acid to the primer as a filler, preferably made water-repellent by means of dichlorodimethylsilane. The fluidity properties of the primer and its hardening reaction can be influenced by these fillers.

Of special importance in regard to environmental compatibility is the fact that isocyanate-terminated compounds, especially isocyanate-terminated polyurethane, can be easily manufactured without solvents. Such a primer free of solvents can easily be worked in application devices which are customary with solvent-free laminating adhesives.

Tests have shown that for the primer to be used with an adhesive label according to the invention an application weight between 1.0 and 5.0 g/m$^2$, preferably between 1.5 and 2.5 g/m$^2$, especially approximately 2.0 g/m$^2$, is recommended. Even if the primer is solvent-free, it need not be protected from moisture in the air. Application of the primer should take place at a temperature between approximately 90° and 100° C., preferably at approximately 95° C. A standard application device can be used for this application.

Normally, hardening of the primer used in the invention for an adhesive label of the type under discussion will take place in about a week. After hardening, the danger of migration of molecules of the adhesive into the printing carrier is extremely low. Because of the choice and standardization of the primer in accordance with the invention it is achieved that even during the hardening time, no significant migration of molecules of the adhesive into the printing carrier take place. On the contrary, the reactive bonding via the terminal-position isocyanate groups takes place here in the manner discussed in detail above.

All sorts of adhesives are suitable for the adhesive layer, i.e., there are no restrictions in regard to the type of the adhesive, the method of application and the application device. Adhesives containing solvents, dispersion adhesives, hot melting adhesives and/or adhesives that are liquid at room temperature, etc. can be used. The consideration of workability, environmental compatibility and, of course, the general consideration of subsequent removal are of special importance for the adhesive layer. Especially considering environmental compatibility, polyacrylate (acrylate copolymer), dispersed in water, is recommended as adhesive. For such an adhesive it is recommended that the dry application weight of the adhesive layer be approximately 17 to 23 g/m$^2$, preferably approximately 18 to 22 g/m$^2$, especially approximately 20 g/m$^2$.

A natural rubber adhesive has proven effective in tests as an adhesive dissolved in a solvent and has shown good results especially with gasoline as a solvent. In this case a dry application weight of 18 to 26 g/m$^2$, preferably between 20 and 24 g/m$^2$, especially approximately 22 g/m$^2$, is recommended.

In general it is true in the selection of the adhesive layer that it must have a sufficient number of hydrogen atoms for the generation of reactive bonds with the primer and that the adhesive properties especially fulfill the requirement of subsequent removability. In this respect it must be noted that the properties of the primer present in accordance with the invention generally result in the adhesive layer being somewhat harder than expected after the hardening process, based on the basic chemical composition—a result of the reactive bond with the primer.

Regarding the cover layer for the adhesive label according to the invention, it is recommended to manufacture it, together with the adhesive-repellent layer, of silicon paper, an outstanding solution in regard to workability and cost effectiveness.

Excellent results are achieved with the adhesive label according to the invention which regard to subsequent removal, since the bonding effect created by the primer favors a smooth peel-off of the adhesive layer from the substrate on which it is glued. The aging properties of the adhesive label are excellent because of the blocking function of the primer of the type according to the invention. Workability is improved since the adhesive label can be easily cut or perforated because of the excellent anchoring of the several layers by the primer, without the adhesive layer exuding from the cut or perforated places, so that further treatment—cutting into rolls, guillotine cutting, stamping out of labels—is easily possible. The use of materials free of solvents results in an excellent environmental compatibility and, at the same time, has a beneficial influence on cost effectiveness.

It was explained in the beginning that the teaching of the invention is also directed to an improved method for manufacturing an adhesive label of the type under discussion. The previously stated object is attained in that the adhesive layer is applied on the cover layer or the adhesive-repellent layer combined with the adhesive layer, in that, if required, then the adhesive layer is pre-dried and in that afterwards the strata made from the cover layer, the adhesive-repellent layer, if present, and the adhesive layer and the stratum made from the printing carrier and primer is combined over its entire surface by placing the adhesive layer on the primer. In accordance with the invention it was realized that the adhesive layer, whether with an adhesive dissolved in a solvent or with an adhesive dispersed in water, is especially effectively dried together with the cover layer and should only then, after reaching an exactly predetermined degree of dryness, be brought into contact with the primer. It is possible by means of the method according to the invention for the primer, applied on the inside of the printing carrier, itself to have an exactly predetermined optimal degree of dryness so that the common further hardening of the primer and the adhesive layer together can be exactly predetermined. In the state of the art from which the teaching of the invention proceeds only a previous and defined pre-drying of the primer, but not of the adhesive layer, was possible. In contrast to this it becomes possible with the method according to the invention to additionally and particularly influence the migratory ability of the molecules of the adhesive layer by means of pre-drying prior to the adhesive layer being brought into contact with the primer.

At the same time an improved workability of the adhesive layer is achieved with the method according to the invention by using the excellently manipulable cover layer, practically inverted, as a support for the adhesive layer.

Altogether the method according to the invention makes it possible to create an adhesive label considerably improved with respect to subsequent removal and aging resistance while at the same time proceeding without manufacturing problems and with cost effectiveness.

With regard to the method, it is recommended to proceed such that the method steps regarding the application of the adhesive layer take place first and that the combination of the two strata take place immediately after the application of the primer to the printing carrier. The time interval for the primers used in accordance with the invention is optimally set at 1 to 5 s, preferably at 2 to 3 s.

Especially these times fixed in accordance with the preferred teaching of the invention make clear that working within the framework of the method according to the invention is completely different from the state of the art.

According to the early course of hardening with regard to the primer, i.e., the anchoring process within the first 24 hours, as explained above, it is recommended to store the adhesive label material, for example, rolled up, for 16 to 24 hours prior to further treatment, i.e. before cutting or perforating it to form individual adhesive labels.

The invention is again briefly described below by means of the drawings showing only one exemplary embodiment. Two exemplary embodiments are additionally given as numerical examples.

DESCRIPTION OF THE PREFERRED EMBODIMENT

Figure 1:
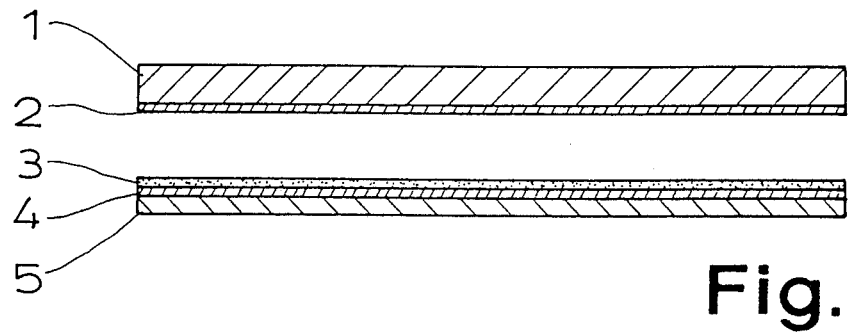
FIG. 1 is a schematic and cross-sectional view of an adhesive label according to the invention prior to the last method step of manufacturing.
Figure 2:
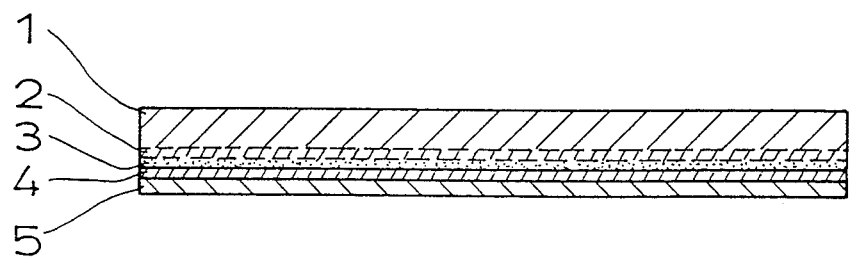
FIG. 2 is the adhesive label after the last method step of manufacturing.

FIGS. 1 and 2 give a good view of the composition of the adhesive label in accordance with the teaching of the invention and in the exemplary embodiment here shown consists of a printing carrier 1, a primer 2 on the backside of the printing carrier 1, an adhesive layer 3 on the side of the primer 2 oriented away from the printing carrier 1, a cover layer 5 on the side of the adhesive layer 3 oriented away from the primer 1 and, in the exemplary embodiment shown here, also of an adhesive-repellent layer 4 between the adhesive layer 3 and the cover layer 5. In the preferred exemplary embodiment here shown the adhesive layer 3 is to be a subsequently removable layer, i.e. to be subsequently removable from a substrate, not shown here, on which it is to be glued and on which it was previously pressed.

In the preferred exemplary embodiment shown here the primer 2 consists of an isocyanate-terminated polyurethane with highly dispersed, pyrogenic and water-repellent silicic acid as filler. The adhesive layer 3 consists of polyacrylate dispersed in water. The application weight of the primer 2 is around 2.0 g/m², that of the adhesive layer 3 around 20 g/m². FIG. 1 shows the state in which the strata made of adhesive layer 3, adhesive-repellent layer 4 and cover layer 5 have been made and in which the adhesive layer 3 already has been pre-dried. In contrast thereto the stratum made from printing carrier 1 and primer 2 has just now been prepared, i.e. approximately 2 seconds ago. The primer 2 therefore is only slightly pre-dried and now is brought, as shown in FIG. 2, into full contact over its entire area with the adhesive layer 3.

In FIG. 2 it is indicated by dashed boundary lines that by use of the primer 2 according to the invention, a reactive bonding of the primer 2 to the printing carrier 1 on the one side and to the adhesive layer 3 on the other takes place. If the cover layer 5 with the adhesive-repellent layer 4 is removed at a later time, for example after the hardening time of the primer 2 of a week, and the adhesive label is stuck on a substrate, the adhesive label can be loosened relatively easily because, on the one hand, the adhesive layer 3 permits renewed removal and, on the other, the adhesive layer 3 has a close bond with the printing carrier 1 via the primer 2.

In a first numerical example the printing carrier 1 consists of label paper 80 g/m². A siliconed glassine paper serves as cover layer 5 with adhesive-repellent layer 4. The printing carrier 1 is coated on its backside, with the aid of a roller applicator device, at 95° C. with the primer 2 which, in this case, is a solvent-free laminated resin. The application weight is about 2 g/m². Within 2 to 3 seconds after the application of the primer 2 the previously manufactured and pre-dried strata made of adhesive layer 3, adhesive-repellent layer 4 and cover layer 5 is applied. The viscosity of the primer 2 at this point in the process lies, depending on the phase, between 1,200 and 2,200 mPas, in this case approximately 2,000 mPas.

The adhesive layer 3 in the exemplary embodiment described here is a 51% aqueous dispersion with a dry application weight of about 20 g/m². Account is taken of the additional hardening to be expected because of the primer 2 in the adhesive layer 3 by admixing 5% softener to the dry weight.

Stable adhesive values have been reached after about a week with the bonding structure previously explained. The adhesive label is very resistant to aging and can be relatively easily loosened from a substrate even after a long time.

In the second example another adhesive layer 3, namely with a solvent-containing adhesive having a dry application weight of about 22 g/m², is used with the primer 2 remaining the same. After evaporation of the solvent the same processing as in the previous exemplary embodiment was used.

It is to be understood that the above described exemplary embodiments of the invention have been given by way of example only and that further variants and improvements are possible within the scope of the invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. An adhesive label comprising the following layers in order:
   a printing carrier;
   a primer consisting essentially of a solvent-free, isocyanate-terminated polyurethane and a highly dispersed, pyrogenic, silicic acid filler;
   an adhesion layer consisting essentially of a polyacrylate dispersed in water; and
   a cover layer; wherein dry application weight of said adhesion layer is from about 17 to about 23 g/m².

2. The adhesive label of claim 1 wherein said silicic acid has been rendered water-repellent by dichlorodimethylsilane.

3. The adhesive label of claim 1 wherein the application weight of the primer ranges from about 1.0 to about 5.0 g/m².

4. The adhesive label of claim 1 wherein the primer is applied at a temperature ranging from about 90° to 100° C.

5. The adhesive label of claim 1 wherein the dry application weight of the adhesion layer is approximately 18 to 22 g/m².

6. The adhesive label of claim 5 wherein the dry application weight of the adhesion layer is approximately 20 g/m².

7. The adhesive label of claim 1 wherein the cover layer is made of silicon paper.

* * * * *